(12) United States Patent
Gershtein et al.

(10) Patent No.: US 7,076,970 B2
(45) Date of Patent: **\*Jul. 18, 2006**

(54) SYSTEM FOR SUPPLY AND DELIVERY OF CARBON DIOXIDE WITH DIFFERENT PURITY REQUIREMENTS

(75) Inventors: Vladimir Yliy Gershtein, Allentown, PA (US); Paul Anthony Mattiola, Coopersburg, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 90 days.

This patent is subject to a terminal disclaimer.

(21) Appl. No.: 10/760,788

(22) Filed: Jan. 19, 2004

(65) Prior Publication Data

US 2005/0155379 A1  Jul. 21, 2005

(51) Int. Cl.
F25J 3/00 (2006.01)
F25J 1/00 (2006.01)
F17C 5/00 (2006.01)

(52) U.S. Cl. .................. 62/617; 62/602; 62/928; 62/54.2

(58) Field of Classification Search .............. 62/617, 62/602, 48.1, 928, 54.2
See application file for complete search history.

(56) References Cited

U.S. PATENT DOCUMENTS 2,551,399 A  12/1945 Silverberg
3,317,278 A  5/1967 Siegfried et al.
4,699,642 A * 10/1987 Perry et al. .................... 62/541
5,237,824 A * 8/1993 Pawliszyn .................... 62/51.1
5,377,705 A  1/1995 Smith, Jr. et al.
5,772,783 A  6/1998 Stucker
5,894,742 A  4/1999 Friedt
5,908,510 A  6/1999 McCullough et al.
6,023,933 A  2/2000 Langan et al.
6,327,872 B1 * 12/2001 Boyd et al. .................... 62/636
6,612,317 B1 * 9/2003 Costantini et al. ........ 134/58 R
6,688,115 B1 * 2/2004 Gershtein .................... 62/54.1
2003/0161780 A1 * 8/2003 Howard et al. .......... 423/437.1
2005/0155377 A1 * 7/2005 Gershtein .................... 62/534

FOREIGN PATENT DOCUMENTS

JP  2002327895  11/2002
WO  WO 03/033114 A1  4/2003
WO  WO 03/033428 A1  4/2003

* cited by examiner

Primary Examiner—William C. Doerrier
(74) Attorney, Agent, or Firm—Rosaleen P. Morris-Oskanian

(57) ABSTRACT

A system for the bulk supply and delivery of a carbon dioxide product stream to at least one process tool in a plurality of applications at varying pressure, purity or other process parameter within a manufacturing facility and method comprising same is disclosed herein. In one embodiment, the system is comprised of: a carbon dioxide source, a carbon dioxide delivery system containing a low pressure delivery and distribution system, and a plurality of applications containing at least one process tool.

20 Claims, 3 Drawing Sheets

SYSTEM FOR SUPPLY AND DELIVERY OF CARBON DIOXIDE WITH DIFFERENT PURITY REQUIREMENTS

BACKGROUND OF THE INVENTION

Highly pressurized carbon dioxide fluids such as liquid, gaseous, or supercritical $CO_2$ (e.g., at or above 31° C. and 1,071 pounds per square inch gauge (psig)) are required for a variety of industrial processes. In certain instances, gaseous, liquefied, or supercritical carbon dioxide may be seen as a replacement for organic solvents or aqueous-based process solutions that are currently in use as cleaning or processing solutions.

Many cleaning or processing applications in the electronic industry may demand the use of carbon dioxide fluids at high flow rates and high pressures. One of the methods for achieving high pressure carbon dioxide has been to pump liquid carbon dioxide to a required pressure. However, pumping liquid carbon dioxide to a high pressure can introduce contaminants, such as particulates, hydrocarbons, halocarbons, etc., to the fluid stream.

Certain industries such as semiconductor manufacturing require high pressure carbon dioxide fluids delivered to a process tool or point of use (POU) at high or ultra high purity (UHP) levels, i.e., having low parts per million (ppm) or low parts per billion (ppb) of contaminants. Small quantities of contaminants are detrimental to the microchip fabrication process in the manufacturing of semiconductor electronic components. Contaminants, in the form of particulates, films, or molecules, can cause a variety of defects, such as short circuits, open circuits, and silicon crystal stacking faults. These defects can cause the failure of the finished component, such as integrated circuits, and these failures can cause significant yield reductions, which greatly increases manufacturing costs. Because of this, cleaning is the most frequently repeated step in the manufacture of integrated circuits. At the 0.18-micrometer design rule, 80 of the approximately 400 total processing steps in the manufacture of an integrated circuit are typically cleaning steps. Substrates typically are cleaned after every contaminating process step and before each high temperature operation to ensure the quality of the integrated circuit.

Semiconductor-applications can generally produce a range of contaminants. Contaminants may be introduced into the carbon dioxide fluid from many sources such as residues from manufacturing process steps such as lithography, etching, stripping, and chemical mechanical planarization (CMP); particulates either indigenous to and/or resulting from manufacturing processes; inorganic particulates or materials such as native or chemical oxides, metal-containing compounds; and contaminants introduced from manufacturing equipment such as pumps, compressors, or other sources. These contaminants can have a vapor pressure either above or below that of carbon dioxide. Higher vapor pressure contaminants may be, for example, fluorine, lower molecular weight fluorinated hydrocarbons, or atmospheric gases such as nitrogen and oxygen. Certain contaminants such as, for example, photoresist residue may be difficult to remove from the carbon dioxide fluid because they are non-volatile.

Current market demands of UHP carbon dioxide fluids are satisfied using cylinder supply and represent a limited development activity for semiconductor manufacturers. However, as semiconductor manufacturers increasingly adopt UHP carbon dioxide as a replacement for aqueous-based process solutions, larger scale or bulk $CO_2$ supply systems will be needed. Typical bulk $CO_2$ supply systems, that are used to deliver and store $CO_2$ in other industries, such as food manufacturing, are operated at a pressure of about 300 psia and temperature varying from about −15° F. to 2° F. or −26° C. to −17° C. Further, these industries do not necessarily require a high or an ultra-high purity (UHP) product. The semiconductor industry, by contrast, require UHP $CO_2$ delivered to the POU or process tool used in processes such as photo-resist removal, deposition, lithography, etc., at significantly higher pressures. The required product pressure at these process tools could vary from 2,000 psig to 10,000 psig. Pressure requirements depend on many factors such as application specifics, tool design, process philosophy, etc.

The semiconductor industry faces significant technical challenges developing the onsite systems that will handle UHP $CO_2$ from bulk sources to process tools. Some of these challenges include, but are not limited to, storage of UHP $CO_2$ in large quantities at high pressures; purity maintenance along the onsite UHP $CO_2$ handling system; liquid product delivery via long pipelines; and liquid product delivery to POU at pressures above 900 psig.

BRIEF SUMMARY OF THE INVENTION

A system for the bulk supply and delivery of a carbon dioxide product stream to at least one process tool in a plurality of applications at varying pressure, purity or other process parameter within a manufacturing facility and method comprising same is disclosed herein. The term "required pressure" as used herein relates to customer's operating pressure or the pressure required for a particular operation. The term "carbon product stream" relates to a fluid stream that contains at least 80% or greater, at least 90% or greater, or at least 95% or greater carbon dioxide.

In one aspect of the present invention, there is provided a system for supplying a purified carbon dioxide product stream to a plurality of applications having one or more required pressure comprising: (a) a carbon dioxide source comprising: a bulk storage vessel having a carbon dioxide feed that is selected from a purified carbon dioxide feed, an unpurified carbon dioxide feed, or a partially purified carbon dioxide feed; (b) a carbon dioxide delivery system in fluid communication with the carbon dioxide source and the applications wherein the pressure of the carbon dioxide feed within the carbon dioxide delivery system is at a first pressure which is below the critical pressure of carbon dioxide and is below the required pressure; (c) the application comprising: (i) at least one process tool wherein the at least one process tool receives the purified carbon dioxide product stream at the required pressure and converts at least a portion of the purified carbon dioxide product stream to a spent carbon dioxide stream; (ii) a pressure elevating device that increases the pressure of the at least a portion of the carbon dioxide feed to a second pressure that is equal to or greater than the required pressure; and (iii) a secondary purification system that is in fluid communication with the at least one process tool and the carbon dioxide delivery system wherein the secondary purification devices purifies at least one selected from the spent carbon dioxide stream, the partially purified carbon dioxide feed, and the unpurified carbon dioxide feed to provide a purified carbon dioxide product stream.

In another aspect of the present invention, there is provided a system for supplying a purified carbon dioxide product stream to a plurality of applications at a required pressure comprising: (a) a carbon dioxide source comprising: (i) a bulk storage vessel having an unpurified carbon dioxide feed wherein the pressure of the unpurified carbon dioxide feed within the vessel is at a first pressure which is below the critical pressure of carbon dioxide and is below the required pressure; (ii) optionally a temperature control system wherein the temperature control system maintains of the carbon dioxide feed within the vessel at one or more temperatures ranging from about −23° C. to about 30° C.; and (iii) optionally a vaporizer; (b) a primary purification system that is in fluid communication with the carbon dioxide source and a carbon dioxide delivery system wherein the primary purification system coverts at least a portion of the unpurified carbon dioxide feed to a purified carbon dioxide feed prior to delivery to the carbon dioxide delivery system and wherein the purified carbon dioxide feed is at a minimum purity level; (c) an optional low pressure storage vessel that stores at least a portion of the purified carbon dioxide feed at the first pressure; and (d) the application comprising: (i) at least one process tool wherein the at least one process tool receives the purified carbon dioxide product stream at the required pressure and converts at least a portion of the purified carbon dioxide product stream to a spent carbon dioxide stream; (ii) a pressure elevating device that increases the pressure of the at least a portion of the carbon dioxide feed to a second pressure that is equal to or greater than the required pressure; and (iii) a secondary purification system that is in fluid communication with the at least one process tool and the carbon dioxide delivery system wherein the secondary purification system purifies at one least one selected from the spent carbon dioxide stream, the partially purified carbon dioxide feed, and the unpurified carbon dioxide feed to provide a purified carbon dioxide product stream.

In a further aspect of the present invention, there is provided a process for delivering a purified carbon dioxide product stream to a plurality of applications at a required pressure wherein each application comprises at least one process tool and a pressure elevating device comprising a vessel, the process comprising: providing a bulk storage vessel having a purified carbon dioxide feed contained therein wherein the purified carbon dioxide feed is at a first pressure which is below the critical pressure of carbon dioxide and is below the required pressure and wherein the temperature of the carbon dioxide is at one or more temperatures ranging about −23° C. to about 30° C.; delivering at least a portion of the purified carbon dioxide feed to the application at the first pressure; converting at least a portion of the purified carbon dioxide feed contained within the vessel to a solid phase carbon dioxide; converting at least a portion of the solid phase carbon dioxide to the purified carbon dioxide product stream until a second pressure is reached wherein the second pressure is at or above the required pressure; maintaining the second pressure within the vessel; and delivering the purified carbon dioxide product stream to the at least one process tool at the required pressure wherein the at least one process tool converts at least a portion of the purified carbon dioxide product stream to a spent carbon dioxide stream.

BRIEF DESCRIPTION OF SEVERAL VIEWS OF THE DRAWINGS

The foregoing and other objects and features of embodiments of the invention will be apparent from the following more particular description of the certain embodiments, as illustrated in the accompanying drawings. In the drawings, like reference characters refer to the same parts throughout different drawings. The drawings are not necessarily to scale.

DETAILED DESCRIPTION OF THE INVENTION

A system for the bulk supply and delivery of a high or an ultrahigh purity (UHP) carbon dioxide product stream to a plurality of applications, $A_1$, $A_2$, through $A_n$, within a manufacturing facility and method comprising same is disclosed herein. In a typical manufacturing facility such as a semiconductor manufacturing facility, an article may be processed in one or more applications having one or more process tools contained therein using a purified carbon dioxide product stream in lieu of, for example, solvent-based or aqueous-based processing or cleaning solutions. The application may contain, but not be limited to, a number of process tools from the same processing step, or alternatively, a number of process tools from a different processing steps but requiring at least one of the same process parameters. Each application can demand different process parameters for the carbon dioxide product stream such as, for example, purity level, flow rate, physical state, pressure, and temperature, relative to other applications.

The terms "processed" or "processing" as used herein means contacting an article with a purified carbon dioxide product stream to effect physical and/or chemical changes to the article. The term "processing" may include, for example, film stripping, cleaning, drying, etching, planarization, deposition, extraction, photoresist development, formation of suspended nano-particles and nano-crystals, etc. The term "article" as used herein means any article of manufacture, which can be contacted with the purified carbon dioxide product stream. Representative articles may include, but are not limited to, silicon or gallium arsenide wafers; reticles; photomasks; flat panel displays; internal surfaces of processing chambers; printed circuit boards; surface mounted assemblies; electronic assemblies; sensitive wafer processing system components; electro-optical, laser and spacecraft hardware; surface micro-machined systems; and other related articles subject to contamination during fabrication.

Figure 1:
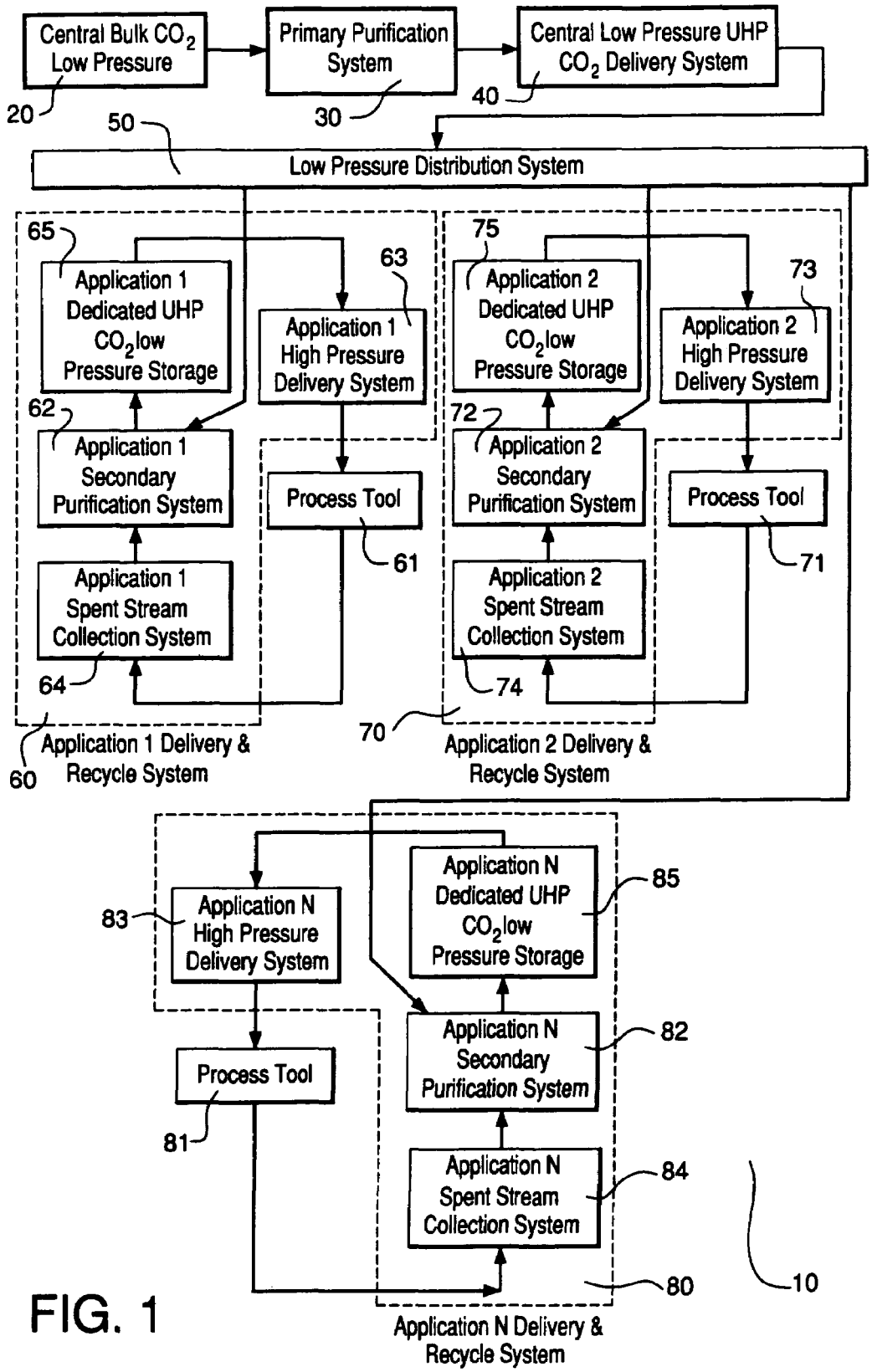
FIG. 1 provides an example of one embodiment of the system of the present invention having multiple POU systems.
Figure 2:
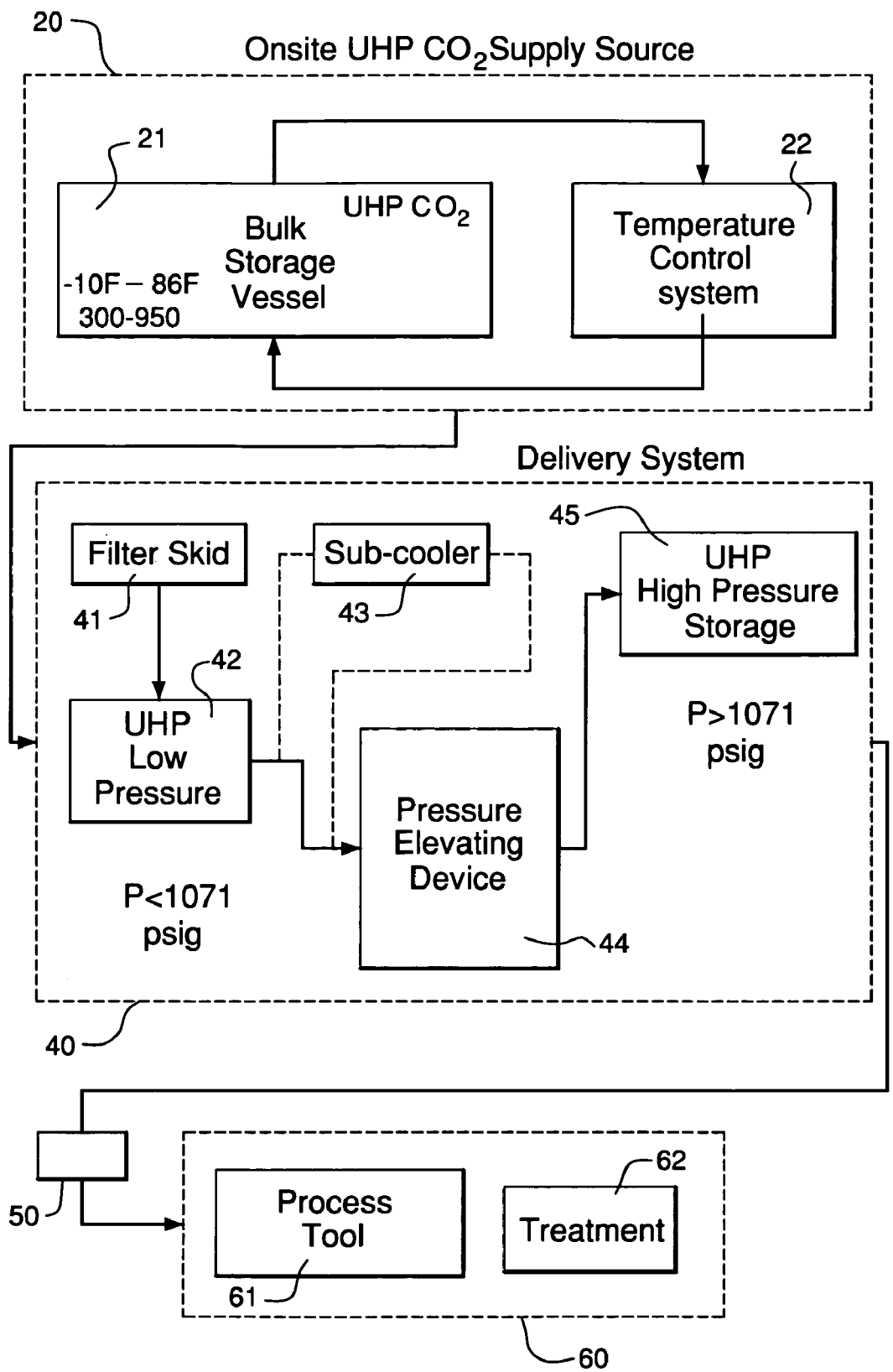
FIG. 2 provides an illustration of certain features of the embodiment shown in FIG. 1.

An example of one embodiment of the system of the present invention is provided in FIGS. 1 and 2. In this system 10, the carbon dioxide feed is delivered to one or more applications such as applications 60, 70, and 80 that correspond to Application 1, Application 2, and Application N, respectively. The number of applications within the system will vary depending upon the requirements of the production facility. Carbon dioxide feed contains at least 80% or greater, at least 90% or greater, or at least 95% or greater carbon dioxide. The carbon dioxide feed in the carbon dioxide source 20 may be an unpurified or a purified feed. In the former embodiment, the carbon dioxide feed can be purified in the central purification system 30 to at least the minimum purity level required by at least one process tool within system 10 which is the referred to herein as the minimum purity level to provide a partially purified carbon dioxide feed. For example, if process tools 61, 71, and 81 within system 10 each individually require a carbon dioxide product stream having a purity level of 1000 ppm, 10 ppm, or 10 ppb, respectively, then the minimum purity level would be 1000 ppm. In alternative embodiments, carbon dioxide feed is delivered to carbon dioxide source 20 at the minimum purity level. In these embodiments, primary purification system 30 may be optional.

Referring to FIGS. 1 and 2, system 10 has a carbon dioxide source 20 that is used for storage of bulk C02 that is delivered to a site. Referring now to FIG. 2, carbon dioxide source 20 also includes one or more bulk storage vessels 21 equipped with an optional temperature control system 22. Bulk storage vessel 21 may contain large quantities, for example, 700 lbs or 2650 liters or greater, of a carbon dioxide feed. In other embodiments, bulk storage vessel 21 may be, for example, a liquid carbon dioxide tank, a railroad tank car, or a truck tailor. Bulk storage vessel 21 is preferably a pressurized vessel. Bulk storage vessel 21 may have an optional temperature control system 22 to maintain a certain temperature of the carbon dioxide feed. The temperature of the carbon dioxide feed inside the bulk storage vessel 21 can vary but is preferably maintained in the range from −15° F. to 86° F. (−26° C. to 30° C.), or from −10° F. to 10° F. (−23°C. to −12° C.). Temperature is maintained by means of sufficient vessel insulation or by a refrigeration/heating system proximal to or incorporated within bulk storage vessel 21 (not shown). Bulk storage vessel 21 is also equipped via pressure control valves, heaters, chillers, heat exchangers, or other means to maintain the pressure of the purified carbon dioxide feed at a first pressure which can vary but is generally below the required pressure, or is below 1,071 psig, or may range from 300 to 950 psig. Carbon dioxide source 20 may also include, but is not limited to, other elements such as supply piping, pressure control valves, safety valves, etc. that may be tailored to suit end-user needs. These elements may be used, for example, to change the temperature, flow rate, pressure, physical state, or other aspects of the carbon dioxide feed. Carbon dioxide source 20 may also include a vaporizer (not shown) when gas delivery is required and or/additional purification system is required, etc. In alternative embodiments, one or more vaporizers can be incorporated into either the first and/or the second purification system.

Primary purification system 30 may be used when the carbon dioxide feed from carbon dioxide source 20 is an unpurified carbon dioxide feed or does not meet the minimum purity level of at least one process tool. FIG. 1 shows a primary purification system 30 that is used to process the unpurified carbon dioxide feed prior to delivery to central carbon dioxide delivery system 40. The purification devices within primary purification system 30 may be arranged in parallel to address the removal of certain contaminants or in series to provide different levels of purification. In the embodiment shown in FIG. 1, primary purification system 30 may be located in one central location as shown. However, in other embodiments, certain elements within primary purification system 30 may be decentralized.

Purification system 30 may contain at least one purification device or purifier. Exemplary purification devices include, but are not limited to, an absorptive bed, a phase change device, a filtration bed, a catalytic oxidizer, a vaporizer, a distillation column, a phase separator, liquefaction means, a centrifuge, or a condenser. These purification devices may be used alone or in combination with each other. A vaporizer may be used for single-stage or multi-stage removal of higher-relative-volatility contaminants as vapor from a liquid carbon dioxide feed, product, or partially purified feed or product. A condensor may be used for single-stage or multi-stage removal of lower-relative-volatility contaminants from a vapor carbon dioxide input feed, product, or partially purified feed or product. An adsorptive bed may be used for the removal of certain contaminants by the selective adsorption of contaminants from the carbon dioxide feed, product, or partially purified feed or product, or alternatively, selective adsorption of the carbon dioxide feed, product, or partially purified feed or product and subsequent desorption. An absorption bed may be used for contaminants by selective absorption of contaminants from the input stream or alternatively, selective absorption of the carbon dioxide feed, product, or partially purified feed or product and subsequent desorbtion. Removal of contaminants can also be accomplished by reactive conversion of the contaminants from a carbon dioxide feed, product, or partially purified feed product by means entailing use of temperature control, reactive species, catalytic materials, or combination thereof. Removal of contaminants can also be accomplished by reactive conversion of the contaminants to another chemical component, which is more easily separated from the carbon dioxide product, by means entailing use of temperature control, reactive species, catalytic materials, or combination thereof and then subsequent removing the chemical component by using any of the purification devices described herein. Removal of contaminants in solid-phase from a liquid-phase or vapor-phase carbon dioxide feed, product, or partially purified feed or product by mechanical means, referred to herein as "solid contaminant purifiers", include, but are not limited to, filtration, crystallization, gravity separation, centrifugal separation or expression, or combinations thereof. Removal of contaminants in vapor-phase or liquid phase from solid-phase carbon dioxide feed, product, or partially purified feed or product by mechanical means, referred to herein as "fluid contaminant purifiers", include, but are not limited to, filtration or gravity separation, centrifugal separation or expression, or combinations thereof.

System 10 may also employ one or more secondary purification systems or application-dedicated purification systems, such as the secondary purification systems 62, 72, and 82 shown in FIG. 1. Secondary purification systems 62, 72, and 82 may be used alone or in combination with primary purification system 30. In these embodiments, primary purification 30 system purifies the carbon dioxide feed to the minimum purity level required by at least one process tool within the system 10 (or the lowest purity level of all the applications within system 10) whereas secondary purification system purifies the carbon dioxide feed to the purity level required by the particular application.

Secondary purification systems 62, 72, and 82 each support a particular application having at least one process tool contained therein. Like primary purification system 30, second purification systems 62, 72, and 82 may contain at least one purification device. Examples of suitable purifications devices include, but are not limited to, an absorptive bed, a phase change device, a filtration bed, a catalytic oxidizer, a vaporizer, a distillation column, a phase separator, liquefaction means, a centrifuge. These purification devices may be used alone or in combination with each other. The purification devices may be arranged in parallel to address, for example, the removal of certain contaminants that result from the process conducted in each POU system or application or, alternatively, in series to provide different levels of purification such as in a staged purification. Secondary purification systems 62, 72, and 82 generally receive a smaller capacity of input, i.e., spent carbon dioxide stream or a partially purified carbon dioxide feed or product, relative to primary purification system 30. In applications wherein the minimum purity level of the carbon dioxide feed is sufficient to meet process requirements, secondary purification system may process the spent carbon dioxide stream only.

Referring to FIG. 1, low pressure carbon dioxide delivery system 40 provides all necessary means to deliver the purified carbon dioxide feed from the carbon dioxide source 20 and optional central purification system 30 to the low pressure delivery system 40 and low pressure distribution system 50. Referring to FIG. 1, delivery system 40 takes the carbon dioxide feed having the minimum purity level from the central purification system 30 and delivers it to the low pressure distribution system 50. Low pressure distribution system 50 then delivers the carbon dioxide feed to the plurality of applications such as Applications 1 through N. Each application has at least one process tool 61, 71, and 81; a application-dedicated pressure elevating device 63, 73, and 83, a secondary purification system 62, 72, and 82, a spent carbon dioxide stream collection system 64, 74, and 84, and a dedicated low pressure storage vessel 65, 75, or 85. Dedicated pressure elevating devices 63, 73, and 83 deliver the purified carbon dioxide product stream to at least one process tool 61, 71, and 81, respectively, at the required pressure, temperature, physical state, flow rate, or other process parameter for each application.

Referring again to FIG. 2, carbon dioxide delivery system 40 may include an optional filter skid 41, one or more optional low pressure storage vessels 42, an optional sub-cooler 43 in fluid communication with pressure elevating device 44, an optional pressure elevating device 44, and one or more optional high pressure storage vessels 45. Delivery system 40 may also include, but not be limited to, pumps, filters, chillers, heat exchangers, vaporizers, product distribution lines, pressure vessels, etc. In certain embodiments, a plurality of low pressure and high pressure storage vessels 42 and 45 may be employed to allow for an uninterrupted supply of the purified or partially purified carbon dioxide feed to low pressure distribution system 50. In other embodiments, pressure elevating device 44 may include vessels within the system that may obviate the need for low and high pressure storage vessels 42 and 45. Delivery system 40 may include filter skid 41, which is used when, for example, pressure elevating device 44 includes moving parts, e.g. pumps, compressors, valves. Delivery system 40 may also include a sub-cooler 43 that can be used to minimize $CO_2$ flashes, such as an unintended partial conversion of liquid into vapor, between the pressure elevating device 44 and the low pressure distribution system 50.

Optional low pressure storage vessel 42 is located upstream of an optional pressure-elevating device 44 and preferably contains the purified carbon dioxide feed at one or more pressures up to 1070 psig. In addition, optional low pressure storage vessel 42 is also designed to preserve specified $CO_2$ purity. In this connection, optional low pressure storage vessel 42 contains a sufficient inventory of purified or partially purified carbon dioxide feed to provide an uninterrupted supply to low pressure distribution system 50 without deleterious variation in supply pressure and without additional special considerations for flow variation upstream of delivery system 40.

Referring again to FIG. 2, optional high pressure storage vessel 45 is located downstream of optional pressure-elevating device 44 and preferably contains carbon dioxide feed with one or more pressures below the critical point pressure of carbon dioxide, at the first pressure, or below the required pressure of applications 60, 70, or 80. In addition, optional high-pressure storage vessel 45 is also designed to preserve specified $CO_2$ purity. Optional high-pressure storage vessel 45 contains sufficient inventory of a purified or partially purified carbon dioxide feed to provide an uninterrupted supply to low pressure distribution system 50 without deleterious variation in supply pressure and without additional special consideration for flow variation upstream of the low pressure delivery system 40. Vessel 45 is used to supply the carbon dioxide product to low pressure distribution system 50 without the use of any additional transporting means, e.g. pumps, compressors, etc. In certain embodiments, the pressure of the purified or partially purified carbon dioxide feed may be at a pressure higher than the required pressure. In these embodiments, the pressure difference between vessel 45 and low pressure distribution system 50 may be used to transport the purified or partially purified carbon dioxide feed to the low pressure distribution system 50.

Referring again to FIG. 1, low pressure distribution system 50 delivers the purified or partially purified carbon dioxide feed at a second pressure to applications 60, 70, or 80. Low pressure distribution system 50 delivers a purified or partially purified carbon dioxide feed at a second pressure to the secondary purification system wherein the carbon dioxide feed is purified to the level required by the at least one process tool 61, 71, and 81. In embodiments wherein the purity requirements for the particular application are the minimum level purity, the purification within the secondary purification system may be optional. The purified carbon dioxide feed is the transferred to the dedicated low pressure storage vessel 65, 75, or 85.

Similar to the optional pressure elevating device 44, dedicated pressure elevating devices 63, 73, and 83 are used to increase the purified carbon dioxide feed pressure from a second pressure to third pressure that is equal to or greater than the required pressure. Pressure elevating devices 63, 73, and 83 may consist of a single pump or plurality of pumps, compressors, etc. In alternative embodiments, pressure elevating devices 34, 63, 73, and 83 may utilize a pump-free system such as the apparatuses disclosed in pending patent applications, U.S. patent application Ser. No. 10/351,188 filed 28 Jan. 2003 and U.S. patent application Ser. No. 10/753,315 filed 9 Jan. 2004, which are commonly assigned to the assignee of the present invention and incorporated herein by reference in their entirety, for the pressurization of the purified carbon dioxide feed. In these embodiments, no rotating or oscillating parts are present, which can contribute to product contamination due to particle shedding. Therefore, filtration and other purification means can be either partially or completely omitted. In addition, the pump-free system may include sufficient product inventory thereby eliminating the need for additional low and high pressure storage vessels within each application.

The at least one process tool receives the purified carbon dioxide product stream at a required pressure for use in its process and, after processing with the purified carbon dioxide product stream, generates a spent carbon dioxide stream. Spent carbon dioxide stream may contain a variety of contaminants depending upon the processing step conducted. The types of contaminants contained within the spend carbon dioxide stream may vary but may include, for example, dissolved gases such as, for example, $H_2O$, $O_2$, COS, CO, $H_2S$; organic compounds such as exposed photoresist material, photoresist residue, UV—or X-ray-hardened photoresist, C—F-containing polymers, low and high molecular weight polymers, and other organic etch residues; inorganic compounds such as metal oxides, ceramic particles from CMP slurries and other inorganic etch residues;

metal containing compounds such as organometallic residues and metal organic compounds; ionic and neutral, light and heavy inorganic (metal) species, moisture, and insoluble materials, including particles generated by planarization and sputter etch processes.

In embodiments such as the system shown in FIG. 1, applications 60, 70, or 80 further includes a spent carbon dioxide collection system 64, 74, and 84. Collection system 64, 74, and 84 may process the spent carbon dioxide stream coming from at least one process tool 61, 71, or 81 and release it in environmentally friendly manner to atmosphere or, alternatively, deliver it to a storage vessel for later reuse in different applications or different industries wherein the purity level of the treated stream does not need to be a high purity or UHP levels. In certain embodiments such as that shown in FIG. 1, the spent carbon dioxide stream may be recycled by purifying it in one or more purification systems, such as secondary purification systems 62, 72, or 82 to provide a purified carbon dioxide product stream prior to reuse in at least one process tool 61, 71, or 81.

The purified carbon dioxide product stream can be delivered to at least one process tool 61, 71, or 81 in a variety of different fluid states such as, for example, high-pressure liquid or supercritical fluid. In certain embodiments, the purified carbon dioxide product stream can be delivered to at least one process tool 61, 71, or 81 as a liquid. In these embodiments, the liquid product stream should have a pressure above the $CO_2$ critical pressure and a temperature below the $CO_2$ critical temperature. A liquid delivery system may optionally include an energy source such as a thermal source to convert the delivered liquid carbon dioxide product into a supercritical carbon dioxide product. In certain embodiments, the thermal source may be an integral part of at least one process tool 61, 71, or 81. In alternative embodiments, purified carbon dioxide product stream can be delivered to at least one process tool 61, 71, or 81 as a supercritical fluid. In these embodiments, the at least one energy source can be incorporated into dedicated pressure elevating device 63, 73, and 83 rather than as part of the at least one process tool 61, 71, or 81. When the carbon dioxide product is in its supercritical state, it is preferably that the distance between dedicated pressure elevating device 63, 73, and 83 and the at least one process tool 61, 71, or 81 be relatively short. For this purpose, the at least one energy source can supporting one or a cluster of process tools and can be located on at the particular POU system for the particular process near the process tool(s) location.

The purified carbon dioxide stream can be further combined with one or more processing agents prior to delivery to the at least one process tool 61, 71, or 81. A processing agent is defined as a compound or combination of compounds that promotes physical and/or chemical changes to an article or in contact with a purified carbon dioxide product stream containing same. In certain instances, it can also enhance the cleaning ability of the purified carbon dioxide product stream to remove contaminants from a contaminated article. Further, the processing agent may solubilize and/or disperse the contaminant within the purified carbon dioxide product stream. These processing agents may include, for example, film strippers, cleaning or drying agents, entrainers such as surfactants, chelating agents, etching or planarization reactants, photoresist developers, and deposition materials or reactants.

Figure 3:
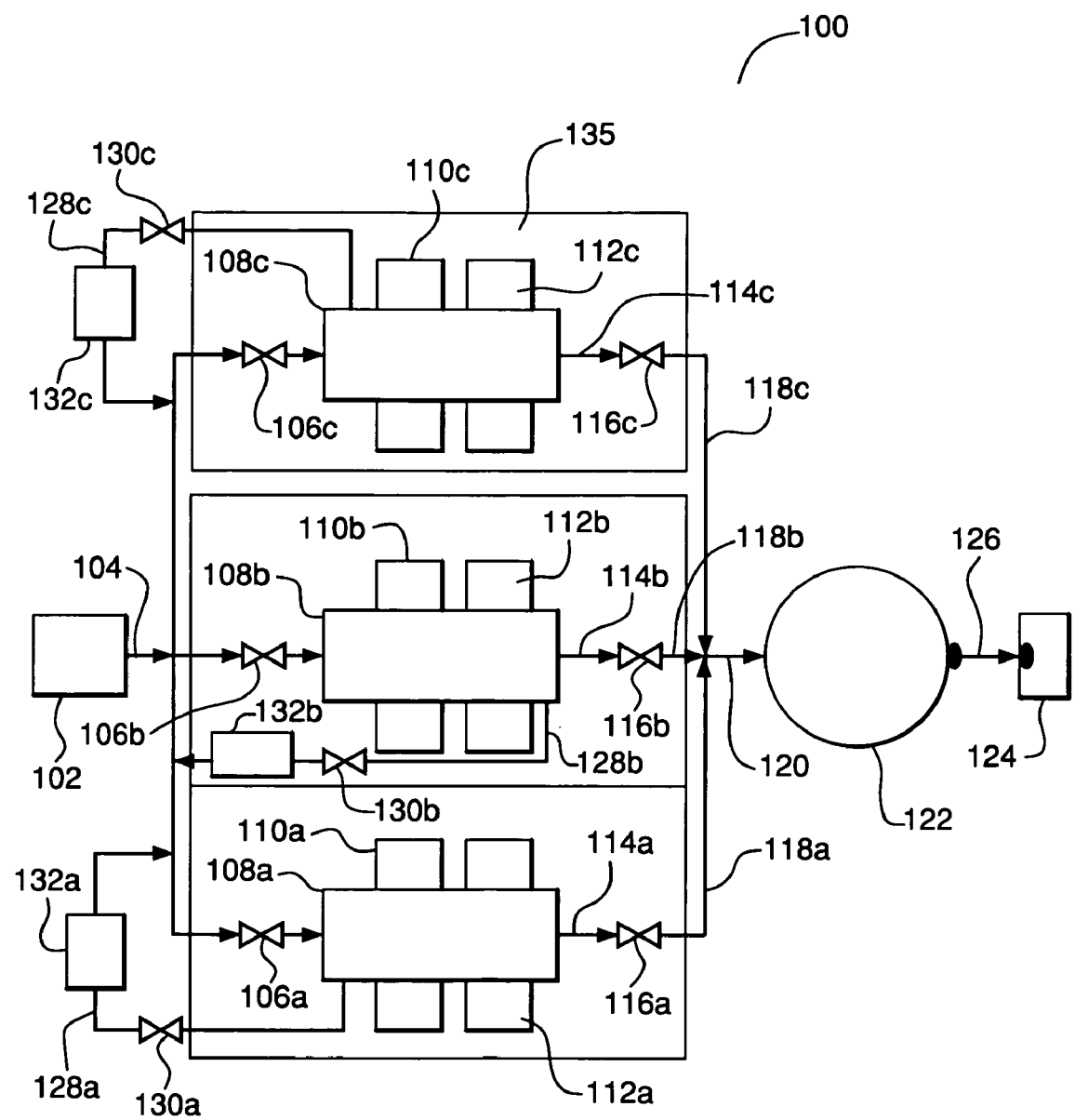
FIG. 3 provides an illustration of an exemplary application system.

FIG. 3 provides an example of a particular embodiment of an application of the present invention, 100, wherein the dedicated pressure elevating device 135 comprises a pump-free system. In operation, a stream of gaseous or liquid feed containing carbon dioxide at initial delivery parameters, for example, liquid carbon dioxide at 300 psig at −5° F. (about −20° C.), is delivered from low pressure distribution system from a carbon dioxide source (not shown) to a holding vessel 102. The gaseous or liquid feed is preferably purified prior to introducing the feed into low pressure distribution system to provide a purified carbon dioxide feed, such as, for example by purifying in the central purification system (not shown). The purified carbon dioxide feed then is removed from vessel 102 by means of line 104, passed through valves 106a, 106b, or 106c and then to vessels 108a, 108b, or 108c respectively. Vessels 108a, 108b, or 108c are used for the generation of slush or a solid phase carbon dioxide feed. The term "slush" as used herein relates to a multiphase mixture of the at least one component that may contain solid, liquid, and vapor phases, preferably solid and liquid phases, of carbon dioxide. The carbon dioxide feed may be at least partially solidified in these vessels, i.e., vessels 108a, 108b, or 108c, with the help of optional chillers 110a, 110b, or 110c respectively.

The function of the chillers is to simply lower the temperature of the carbon dioxide inside vessels 108a, 108b, or 108c to a temperature equal or below the carbon dioxide solidification point. In alternative embodiments such as when the carbon feed is delivered in liquid form, chillers 110a, 110b, or 110c may not be necessary and sudden expansion of the feed stream by reducing the pressure to a pressure that is below the pressure of the incoming feed stream can be used to form a solid-vapor or a liquid-vapor for solid phase source or slush generation in vessels 108a, 108b, or 108c. As solid carbon dioxide is formed, additional carbon dioxide feed from tank 102 is added to the respective vessels 108a, 108b, or 108c until that vessel is substantially, or preferably completely, filled with solid carbon dioxide or preferably with a solid-liquid mixture of carbon dioxide, i.e., slush. At that time, vessel 108a, 108b or 108c is isolated from tank 102 by closing appropriate valve 106a, 106b, or 106c.

To effect conversion of solid phase source carbon dioxide to a fluid product and pressurization thereof, the apparatus may incorporate at least one energy source such as, for example, heaters 112a, 112b, or 112c. These heaters, which are attached or built into the respective vessels 108a, 108b or 108c, are activated for heating and effecting the melting of the solid form of the carbon dioxide. In other embodiments, at least one energy source, besides or in addition to thermal energy (i.e., heaters), such as, for example, radiation, microwave, ultrasonic, laser or other sources may be used to covert at least portion of the solid phase source to a fluid product. Conversion of solid carbon dioxide to a fluid product may occur within isochoric conditions, i.e., maintaining a constant volume of the heated vessel. Isochoric heating of the high density substance, such as, for example, solid or slush carbon dioxide, provides the mechanism to increase the pressure of the resulting carbon dioxide fluid product to any pressure desired in the process and to deliver a lower density substance, such as for example, a fluid product such as liquid carbon dioxide, to the at least one process tool at the required pressure. This pressure increase can be obtained without effecting a substantial change in the average slush temperature or internal temperature of carbon dioxide within the vessel. Operating over a narrow temperature range may allow for efficient use of the at least one energy source.

Fluid product can be withdrawn from vessels 108a, 108b and 108c via lines 114a, 114b and 114c and passed through pressure control valves 116a, 116b and 116c, respectively.

Pressure control valves 116a, 116b and 116c maintain a controlled pressure within vessels, 108a, 108b, or 108c. The controlled pressure could be a constant or fixed pressure or could be oscillated, for example, to generate slush. The fluid product can be transported via lines 118a, 118b and 118c respectively via line 120 and to an optional surge tank 122. The fluid product can be delivered to the at least one process tool 124 with an application via line 126 and/or from optional surge tank 122 at a required pressure, as for example, between 300 and 10,000 psig, and at a delivery temperature below the critical temperature, i.e., the highest temperature at which distinct vapor and liquid phases can coexist for the carbon dioxide, e.g., 77° F. (or 25° C.), which is below the critical temperature of $CO_2$ or 87.9° F. (or 31.1° C.).

Since the density of the solid carbon dioxide is approximately 1.5 times greater then that of carbon dioxide in the liquid state, a significant volume of a carbon dioxide can be removed from vessel 108a, 108b or 108c at any preselected pressure. Liquid carbon dioxide product can be removed from each vessel at a rate, which is generally equal to the melting rate of the solid carbon dioxide within each vessel 108a, 108b or 108c. In this connection, the removal of liquid carbon dioxide product from each vessel may be immediately replaced with liquid carbon dioxide formed on conversion of the solid carbon dioxide to liquid carbon dioxide. By effecting withdrawal of liquid carbon dioxide at a rate substantially equal to the rate of formation of liquid carbon dioxide, the pressure inside vessels 108a, 108b or 108c can be maintained at a desired pressure that is a pressure at or above the required pressure. Withdrawal of liquid carbon dioxide from the process is terminated when the solid phase carbon dioxide is substantially or completely converted to liquid.

In alternative embodiments, a three phase slush, i.e. a mixture of solid, liquid, and vapor, can coexist inside vessels 108a, 108b, and 108c. The presence of the vapor phase contained therein may take more time and energy to reach relatively high pressures due to its compressibility. At higher pressures, there may be no vapor phase left because it condenses into the liquid phase. Several loops, as shown in the three unit system can be used to provide continuous flow of a purified carbon dioxide product stream to optional high pressure storage vessel 122. Each loop typically will be operated with a cycle shifted in time relative to the neighboring loop.

FIG. 3 also includes a recycle flow network for the removal, purification, and recycling of effluent vapor contained within vessels 108a, 108b, and 108c shown. Vessels 108a, 108b, and 108c are in fluid communication with lines 128a, 128b, and 128c, respectively. Lines 128a, 128b, and 128c further include valves 130a, 130b, and 130c. However, in other embodiments, effluent vapor can be withdrawn, for example, through pressure control valves 116a, 116b, and 116b. In the embodiment shown in FIG. 6, effluent vapor from vessels 108a, 108b, and 108c is recycled and reintroduced into vessels 108a, 108b, and 108c through valves 106a, 106b, and 106c. In this embodiment, lines 128a, 128b, and 128c or the recycle flow network may also include at least one purifying device 132a, 132b, and 132c, such as, but not limited to, a filter, a distiller, an adsorbent bed, a scrubber, or other device suitable for removing contaminants from the effluent vapor such as the devices disclosed herein. In other embodiments, however, effluent vapor may be vented from vessels 108a, 108b, and 108c rather than recycled.

It is preferred that all equipment contained within the system that are in contact with the carbon dioxide feed and product stream satisfy high and UHP product requirements. In this connection, all wetted parts should not react with the carbon dioxide feed or product stream and should not introduce any contaminants in various forms such as particles, metals, atmospheric gases, etc. Further, it is preferred that the various elements within the system be selected withstand maximum design pressure, for example, 10,000 psig.

While this invention has been particularly shown and described with references to particular embodiments thereof, it will be understood by those skilled in the art that various changes in form and details may be made therein without departing from the scope of the invention encompassed by the appended claims.

We claim:

1. A system for supplying a carbon dioxide to a plurality of applications, the system comprising:
    (a) a carbon dioxide source comprising: a bulk storage vessel having a carbon dioxide feed that is selected from a purified carbon dioxide feed, an unpurified carbon dioxide feed, or a partially purified carbon dioxide feed;
    (b) a low pressure carbon dioxide delivery system in fluid communication with the carbon dioxide source and each of the applications wherein the pressure of the carbon dioxide feed within the carbon dioxide delivery system is at a first pressure which is below the critical pressure of carbon dioxide and is below the required pressure,
    wherein each of the plurality of applications comprises:
        (i) a low pressure storage vessel that stores at least a portion of the carbon dioxide feed at the first pressure;
        (ii) a pressure elevating device that increases the pressure of the at least a portion of the carbon dioxide feed to a second pressure that is equal to or greater than the required pressure prior to operation of the process tool utilizing the stream; and
        (iii) at least one process tool wherein the at least one process tool receives the carbon dioxide feed at the required pressure and converts at least a portion of the carbon dioxide feed to a spent carbon dioxide stream, wherein the spent carbon dioxide stream is not returned to the low pressure carbon dioxide delivery system.

2. The system of claim 1 further comprising a primary purification system in fluid communication with the carbon dioxide source and the carbon dioxide delivery system.

3. The system of claim 2 wherein the primary purification system has at least one purifier selected from an adsorptive bed, a filtration bed, a catalytic oxidizer, a vaporizer, a distillation column, a phase separator, a liquefaction means, a centrifuge, an absorptive bed, and combinations thereof.

4. The system of claim 1 wherein the carbon dioxide feed at the second pressure is a supercritical fluid.

5. The system of claim 1 wherein the carbon dioxide feed is a liquid.

6. The system of claim 1 wherein the bulk storage vessel contains a purified carbon dioxide feed.

7. The system of claim 1 wherein the application further comprises a high pressure storage vessel that stores at least a portion of the carbon dioxide feed at the second pressure.

8. The system of claim 7 wherein the pressure elevating device delivers at least a portion of the carbon dioxide feed at the second pressure to the high pressure storage vessel.

9. The system of claim 1 wherein the pressure elevating device is free of mechanical pumps and provides the carbon dioxide feed at the second pressure.

10. The system of claim 1 wherein the spent carbon dioxide stream is vented.

11. A system for supplying carbon dioxide to a plurality of applications at a required pressure, the system comprising:
(a) a carbon dioxide source comprising:
  (i) a bulk storage vessel having an unpurified carbon dioxide feed wherein the pressure of the unpurified carbon dioxide feed within the vessel is at a first pressure which is below the critical pressure of carbon dioxide and is below the required pressure;
  (ii) optionally a temperature control system wherein the temperature control system maintains of the carbon dioxide feed within the vessel at one or more temperatures ranging from about −23° C. to about 30° C.; and
  (iii) optionally a vaporizer;
(b) a primary purification system that is in fluid communication with the carbon dioxide source and a carbon dioxide delivery system wherein the primary purification system converts at least a portion of the unpurified carbon dioxide feed to a purified carbon dioxide feed prior to delivery to the carbon dioxide delivery system and wherein the purified carbon dioxide feed is at a minimum purity level;
(c) an optional low pressure storage vessel that stores at least a portion of the purified carbon dioxide feed at the first pressure; and
(d) the application comprising:
  (i) at least one process tool wherein the at least one process tool receives the purified carbon dioxide feed at the required pressure and converts at least a portion of the purified carbon dioxide feed to a spent carbon dioxide stream;
  (ii) a pressure elevating device that increases the pressure of the at least a portion of the carbon dioxide feed to a second pressure that is equal to or greater than the required pressure; and
  (iii) a low pressure storage vessel that stores at least a portion of the purified carbon dioxide feed at the first pressure.

12. A process for delivering a carbon dioxide product stream to a plurality of applications at a required pressure wherein each application comprises at least one process tool and a pressure elevating device comprising a vessel, the process comprising:
providing the system of claim 1 wherein the bulk storage vessel has a carbon dioxide feed contained therein wherein the carbon dioxide feed is at a first pressure which is below the critical pressure of carbon dioxide and is below the required pressure and wherein the temperature of the carbon dioxide is at one or more temperatures ranging about −23° C. to about 30° C.;
delivering at least a portion of the carbon dioxide feed to the application at the first pressure;
converting at least a portion of the carbon dioxide feed contained within the vessel to a solid phase carbon dioxide:
converting at least a portion of the solid phase carbon dioxide to the carbon dioxide product stream until a second pressure is reached wherein the second pressure is at or above the required pressure;
maintaining the second pressure within the vessel; and
delivering the carbon dioxide product stream to the at least one process tool at the required pressure wherein the at least one process tool converts at least a portion of the carbon dioxide product stream to a spent carbon dioxide stream.

13. The process of claim 12 wherein the first converting step comprises reducing a pressure of the carbon dioxide feed below the triple-point pressure of carbon dioxide.

14. The process of claim 12 wherein the first converting step comprises reducing a temperature of the carbon dioxide feed contained within the vessel.

15. The process of claim 12 wherein the second converting step comprises applying an energy source to the solid phase carbon dioxide.

16. The process of claim 15 wherein energy source is at least one selected from the group consisting of thermal, microwave, radiation, ultrasonic, sonic, laser, and mixtures thereof.

17. The system of claim 1 wherein each of the plurality of applications further comprises an application-specific purification system that is in fluid communication with the at least one process tool and the carbon dioxide delivery system wherein the application-specific purification system purifies at least one selected from the spent carbon dioxide stream, the partially purified carbon dioxide feed, and the unpurified carbon dioxide feed to provide a purified carbon dioxide product stream.

18. The system of claim 17 wherein the application-specific purification system comprisies at least one purifier selected from an adsorptive bed, a filtration bed, a catalytic oxidizer, a vaporizer, a distillation column, a phase separator, a liquefaction means, a centrifuge, an absorptive bed, and combinations thereof.

19. The system of claim 18 wherein the pressure elevating device provides a partially purified carbon dioxide product stream and wherein the partially purified carbon dioxide product stream is passed through the application-specific purification system to provide a purified carbon dioxide feed.

20. The process of claim 11 wherein each of the plurality of applications further comprises an application-specific purification system that is in fluid communication with the at least one process tool and the carbon dioxide delivery system wherein the application-specific purification system purifies at one least one selected from the spent carbon dioxide stream, the partially purified carbon dioxide feed, and the unpurified carbon dioxide feed to provide a purified carbon dioxide product stream.

* * * * *